UNITED STATES PATENT OFFICE.

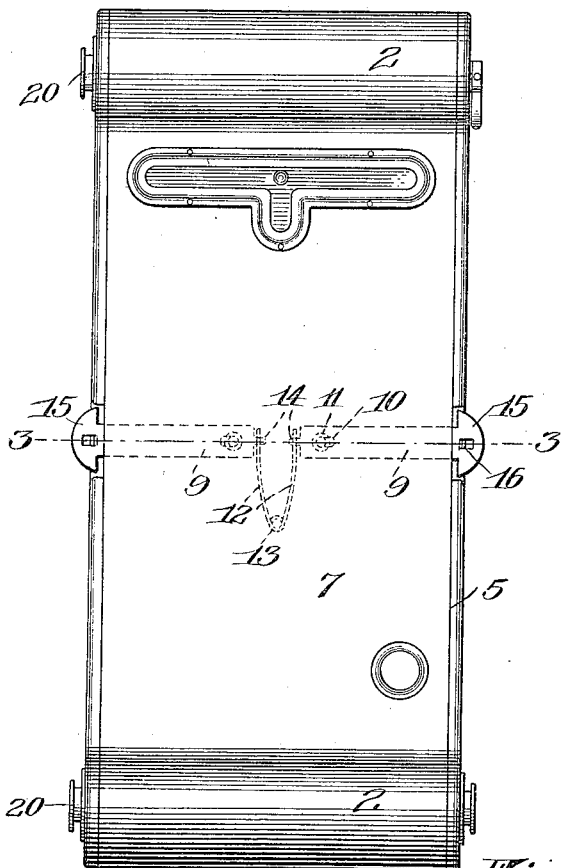
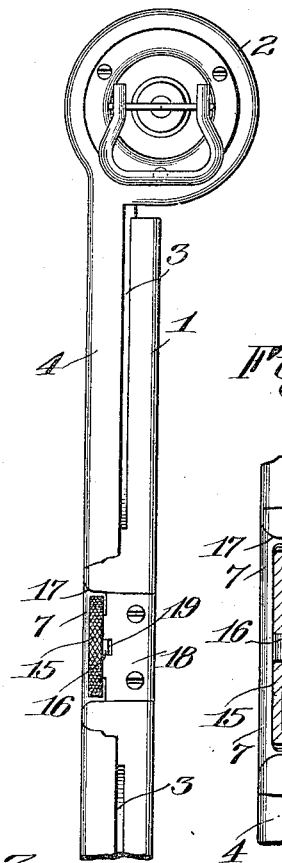
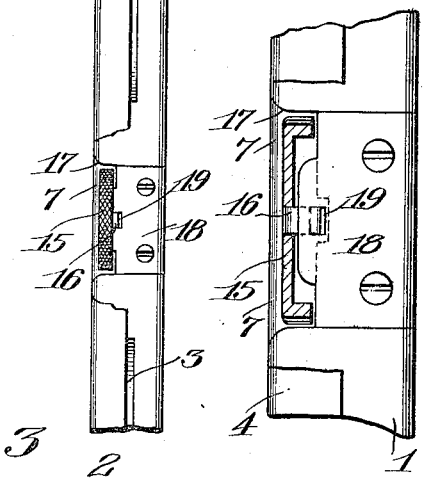
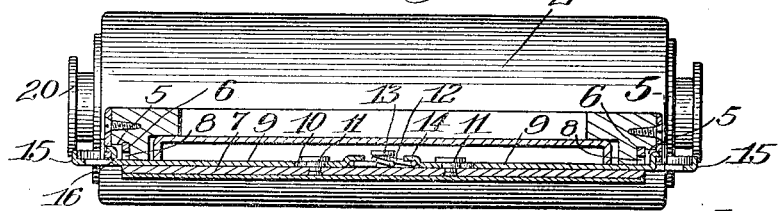
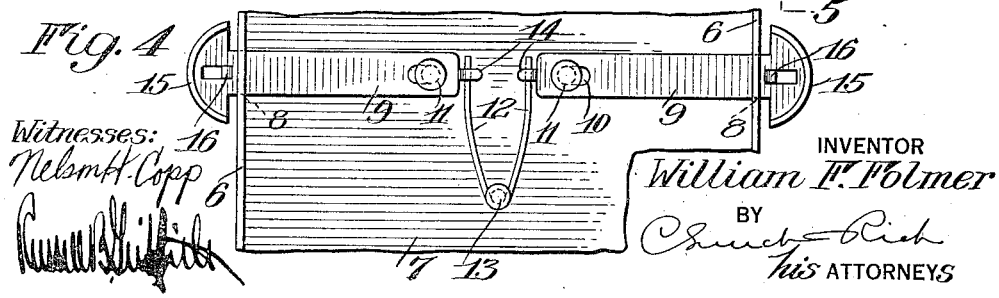

WILLIAM F. FOLMER, OF ROCHESTER, NEW YORK, ASSIGNOR TO EASTMAN KODAK COMPANY, OF ROCHESTER, NEW YORK, A CORPORATION OF NEW YORK.

CATCH FOR CAMERA-BACKS.

1,278,323.

Specification of Letters Patent. Patented Sept. 10, 1918.

Application filed April 18, 1918. Serial No. 229,271.

*To all whom it may concern:*

Be it known that I, WILLIAM F. FOLMER, of Rochester, in the county of Monroe and State of New York, have invented certain new and useful Improvements in Catches for Camera-Backs; and I do hereby declare the following to be a full, clear, and exact description of the same, reference being had to the accompanying drawings, forming a part of this specification, and to the reference-numerals marked thereon.

My present invention relates to photography and more particularly to photographic cameras and it has for its object to provide an improved catch for locking the removable back upon a camera or roll holder, the improvements being directed toward rendering the catch strong and positive in its action and convenient in manipulation. To these and other ends the invention resides in certain improvements and combinations of parts all as will be hereinafter more fully described, the novel features being pointed out in the claims at the end of the specification.

In the drawings:

Figure 1 is a rear view of a photographic roll holder provided with a back and back catches constructed in accordance with and illustrating one embodiment of my invention;

Fig. 2 is an enlarged side elevation thereof with the lower portion broken away;

Fig. 3 is an enlarged section taken substantially on the line 3—3 of Fig. 1;

Fig. 4 is an enlarged fragmentary view of the inner or front side of the back in the region of the catches, and Fig. 5 is an enlarged fragmentary section through one of the catches taken substantially on the line 5—5 of Fig. 3.

Similar reference numerals throughout the several views indicate the same parts.

In the present instance, I have illustrated a back applied to a roll holder 1 for attachment to the rear of a camera body though it is obvious that the back may be directly applied to a camera in the same way and therefore the part 1 may be considered to represent the rear of a camera body or an attachment thereon. The roll holding chambers are indicated at 2; 3 are grooves utilized in attaching the holder to the camera and 4 is the usual leather covering which is broken
away in Fig. 2, for instance, in order not to confuse the showing.

The holder or body portion 1 is provided on its rear side with the usual marginal grooves 5 for the reception of the usual side or edge flanges 6 of the back plates 7 to constitute a light lock that renders the interior light tight when the back is applied. In the practice of my invention, I utilize these flanges 6 of the back by perforating them at 8 to guide the outer ends of two sliding catch plates 9, the inner ends of which are slotted at 10 to ride on headed guide pins 11. These inner ends of the plates are also engaged and inner ends pressed apart by the arms 12 of a normally pressed apart by the arms 12 of a spring coiled about the pin 13 on the inside of the back 7, said spring arms being held in engagement by ears 14 on the catch plates. The latter terminate at their outer ends outside of the flanges 6 in semi-circular knurled finger-pieces 15 from which are struck out offset locking fingers 16. Portions of the outer walls of the light lock grooves 5 of the member 1 are cut out at 17 to give clearance for the ends of the catches and occupying a central portion of each of such cutaway portions is a keeper plate 18 having a locking aperture 19 therein.

When the back is applied, the finger pieces 15 are pressed together which causes the locking fingers 16 to enter the light lock slots 5 with the flanges 6 of the finger-pieces, the upon releasing the said finger-pieces, the spring arms 12 thrust them outwardly in opposite directions and cause the locking fingers 16 of the catch plates to engage in the apertures 19 of the keeper plates 18, thus securely retaining the back in place. The locking fingers are released in a similar manner by again pinching the finger-pieces together. The keeper plate 18 is thinner than the outer wall of the slot 5 to which it is applied so that room is afforded for the engaging and disengaging movement of the locking finger 16 without making said slot too 10 wide for the back flange 6.

Locking members of the nature of these catches may be made strong and durable and easily accessible to the fingers which are afforded a good grip thereon without making 1( them unduly heavy or conspicuous. In practice, I prefer to cause the finger portions 15 to project laterally a distance equal to or less than the degree of projection of the centering devices 20 for the film spools in the chambers 2 so that the catches do not interfere with the stability of the camera when it is laid upon its side.

I claim as my invention:

1. The combination with a camera body having marginal light lock grooves at the rear thereof, of a back provided with lateral flanges coöperating with the grooves and a sliding catch mounted on the back to engage the body and guided in one of the said flanges of the back.

2. The combination with a camera body having marginal light lock grooves at the rear thereof, of a back provided with lateral flanges coöperating with the grooves, sliding catches guided in the flanges and movable outwardly in opposite directions to lock with the body and finger-pieces on the catches projecting laterally of the body and back.

3. The combination with a camera body having marginal light lock grooves at the rear thereof, of a back provided with lateral flanges coöperating with the grooves, sliding catches guided in the flanges and movable outwardly in opposite directions to lock with the body, and a spring arranged to act between and against the inner ends of the catches to move them into locking position.

4. The combination with a camera body having marginal light lock grooves at the rear thereof and an apertured keeper on the outer wall of one of the grooves, of a back having lateral flanges coöperating with the grooves and a sliding latch thereon movable transversely of one of the flanges and provided with an offset locking projection adapted to coöperate with the aperture in the keeper.

WILLIAM F. FOLMER.

Copies of this patent may be obtained for five cents each, by addressing the "Commissioner of Patents, Washington, D. C."